United States Patent

DuVal

(10) Patent No.: US 9,676,053 B2
(45) Date of Patent: Jun. 13, 2017

(54) INDUCTOR AND SYSTEM FOR WELDING FOR MAINTAINING WELDING ARCS

(71) Applicant: Illinois Tool Works Inc., Glenview, IL (US)

(72) Inventor: Randall J. DuVal, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 540 days.

(21) Appl. No.: 13/910,045

(22) Filed: Jun. 4, 2013

(65) Prior Publication Data

US 2014/0027442 A1    Jan. 30, 2014

Related U.S. Application Data

(60) Provisional application No. 61/676,663, filed on Jul. 27, 2012.

(51) Int. Cl.
```
A23B 5/00      (2006.01)
B23K 13/01     (2006.01)
B23K 9/10      (2006.01)
H01F 27/26     (2006.01)
H01F 37/00     (2006.01)
```

(52) U.S. Cl.
CPC ............ *B23K 13/01* (2013.01); *B23K 9/1043* (2013.01); *H01F 27/263* (2013.01); *H01F 37/00* (2013.01)

(58) Field of Classification Search
CPC ..... B23K 13/01; B23K 9/1043; H01F 27/263; H01F 37/00
USPC .... 219/130.1, 130.5, 137.7, 137.71, 137 PS, 219/617
See application file for complete search history.

(56) References Cited

U.S. PATENT DOCUMENTS

| | | | | |
|---|---|---|---|---|
| 1,783,063 A | * | 11/1930 | Vienneau | H01F 27/245 29/609 |
| 3,480,757 A | * | 11/1969 | Ogden | B23K 9/10 219/134 |
| 5,113,049 A | * | 5/1992 | Border | B23K 13/01 219/672 |
| 5,753,888 A | * | 5/1998 | Eldridge | B23K 9/073 219/130.1 |

(Continued)

FOREIGN PATENT DOCUMENTS

| CN | 2115171 | 9/1992 |
|---|---|---|
| CN | 1261016 | 7/2000 |

(Continued)

OTHER PUBLICATIONS

International Search Report for PCT application No. PCT/US2013/052374 dated Apr. 23, 2014, 14 pgs.

*Primary Examiner* — Quang D Thanh
*Assistant Examiner* — Joseph Iskra
(74) *Attorney, Agent, or Firm* — Fletcher Yoder P.C.

(57) ABSTRACT

A welding system includes an inductor on an output of a welding power supply. The power supply may be of the type including an engine and a generator for producing power, with power conversion circuitry conditioning the power to a form suitable for a stick welding application. The inductor has an inductance sufficient for storing energy for maintaining a welding arc with XX10 electrodes, such as on the order of 700 mH. The inductor may have a particular structure, such as one designed around T and L shaped core elements.

14 Claims, 4 Drawing Sheets

(56) References Cited

U.S. PATENT DOCUMENTS

| | | | | |
|---|---|---|---|---|
| 6,111,216 A | * | 8/2000 | Stava | B23K 9/091 |
| | | | | 219/130.51 |
| 7,327,063 B2 | * | 2/2008 | Matsubara | H02K 1/00 |
| | | | | 310/184 |
| 2004/0085173 A1 | | 5/2004 | Decristofaro | |
| 2004/0196128 A1 | | 10/2004 | DuVal | |
| 2006/0016791 A1 | | 1/2006 | Fosbinder | |
| 2009/0039063 A1 | * | 2/2009 | Madsen | B23K 9/091 |
| | | | | 219/130.5 |

FOREIGN PATENT DOCUMENTS

| | | | |
|---|---|---|---|
| CN | 2641781 | | 9/2004 |
| CN | 200941331 | * | 8/2007 |
| CN | 102451945 | | 5/2012 |

\* cited by examiner

INDUCTOR AND SYSTEM FOR WELDING FOR MAINTAINING WELDING ARCS

CROSS REFERENCE TO RELATED APPLICATIONS

This application is a Non provisional U.S. Patent Application of U.S. Provisional Application No. 61/676,663, entitled "Inductor and System for Welding for Maintaining Welding Arcs", filed Jul. 27, 2012, which is hereby incorporated by reference in its entirety.

BACKGROUND

The present invention relates generally to power electronic devices and circuitry for conditioning power.

Many systems are designed for use in industrial power electronics, typically for generating and converting power to useful forms for specific loads and applications. For example, power electronic devices are used in such applications as welding, motor control, power distribution, and so forth. Many such circuits utilize large power devices, such as transformers, capacitors and inductors to appropriately convert and condition both alternating current (AC) and direct current (DC) power. Once particular component often found in such systems are inductors. Such inductors are sometimes referred to as "chokes" and are often provided for smoothing or conditioning power both on DC busses and DC and AC outputs. In general, inductors comprise coils or conductive windings through which power is transmitted. Cores associated with such inductors allow for the storage of power in the form of electromagnetic flux. The inductance of the coil and core combination is selected dependent upon the particular application. Many different designs for such devices have been devised and are currently in use.

Nevertheless, there is still a need for inductor designs for use in specific types of applications. For example, in engine generator-driven welders, output inductors are commonly used for storing output power. Specific inductor designs are needed to accommodate different types of welding electrodes and welding processes.

BRIEF DESCRIPTION

The present invention provides an inductor design adapted for such needs. In particular, the embodiments of the invention allow for storage of energy sufficient to maintain welding arcs with XX10 electrodes, while not compromising performance with) XX18 electrodes. In accordance with certain embodiments, an inductor for a welding power supply comprises an L shaped core element and a T shaped core element. The T shaped core element has a central extension with an end disposed adjacent to a short side of the L shaped core element and a top section disposed adjacent to a long side of the L shaped core element. Spacers are disposed between the L and T shaped core sections at locations where the core sections approach one another. Combs are disposed about the central extension of the T shaped core element. A winding is disposed in the combs and spaced from the core elements. The inductor has an inductance sufficient to store energy to maintain an arc with an XX10 electrode, such as on the order of 700 mH.

In accordance with another aspect of the invention, a welding system comprises power conversion circuitry configured to provide output power suitable for performing a stick welding operation, and a torch coupled to the power supply and configured to hold a stick electrode and to transfer the output power to the stick electrode for the stick welding application. An inductor is coupled between the power conversion circuitry and the torch, and has an inductance sufficient to store energy to maintain an arc with an XX10 electrode.

In accordance with still another aspect of the invention, a welding method comprises providing electrical power suitable for performing a stick welding operation via power conversion circuitry, initiating and maintaining an arc between an XX10 electrode and a workpiece with power output by the power conversion circuitry, and storing energy in an inductor disposed between the power conversion circuitry and the electrode, the inductor having an inductance sufficient to store energy to maintain an arc with an XX10 electrode.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
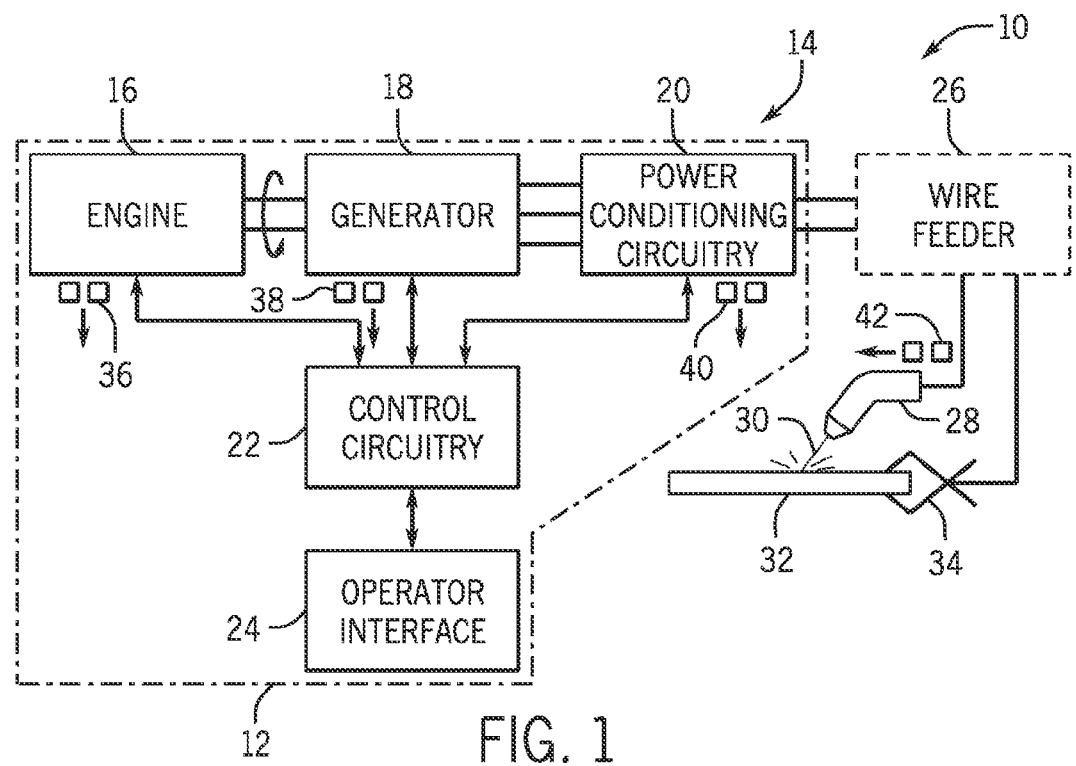
FIG. 1 is a diagrammatical representation of an exemplary application for power conversion circuitry, in the form of a welding system.

Turning now to the drawings, and referring first to FIG. 1, an exemplary welding system 10 is illustrated that includes a power supply 12 for providing power for welding, plasma cutting and similar applications. The power supply 12 in the illustrated embodiment comprises an engine generator set 14 that itself includes an internal combustion engine 16 and a generator 18. The engine 16 may be of any suitable type, such as gasoline engines or diesel engines, and will generally be of a size appropriate for the power output anticipated for the application. The engine will be particularly sized to drive the generator 18 to produce one or more forms of output power. In the contemplated application, the generator 18 is wound for producing multiple types of output power, such as welding power, as well as auxiliary power for lights, power tools, and so forth, and these may take the form of both AC and DC outputs. Various support components and systems of the engine and generator are not illustrated specifically in FIG. 1, but these will typically include batteries, battery chargers, fuel and exhaust systems, and so forth.

Power conditioning circuitry 20 is coupled to the generator 18 to receive power generated during operation and to convert the power to a form desired for a load or application. In the illustrated embodiment generator 18 produces three-phase power that is applied to the power conditioning circuitry 20. In certain embodiments, however, the generator may produce single phase power. The power conditioning circuitry includes components which receive the incoming power, converted to a DC form, and further filter and convert the power to the desired output form. More will be said about the power conditioning circuitry 20 in the discussion below.

The engine 16, the generator 18 and the power conditioning circuitry 20 are all coupled to control circuitry, illustrated generally by reference numeral 22. In practice, the control circuitry 22 may comprise one or more actual circuits, as well as firmware and software configured to monitor operation of the engine, the generator and the power conditioning circuitry, as well as certain loads in specific applications. Portions of the control circuitry may be centrally located as illustrated, or the circuitry may be divided to control the engine, generator and power conditioning circuitry separately. In most applications, however, such separated control circuits may communicate with one another in some form to coordinate control of these system components. The control circuitry 22 is coupled to an operator interface 24. In most applications, the operator interface will include a surface-mounted control panel that allows a system operator to control aspects of the operation and output, and to monitor or read parameters of the system operation. In a welding application, for example, the operator interface may allow the operator to select various welding processes, current and voltage levels, as well as specific regimes for welding operations. These are communicated to a control circuitry, which itself comprises one or more processors and support memory. Based upon the operator selections, then, the control circuitry will implement particular control regimes stored in the memory via the processors. Such memory may also store temporary parameters during operation, such as for facilitating feedback control.

Also illustrated in FIG. 1 for the welding application is an optional wire feeder 26. As will be appreciated by those skilled in the art, such wire feeders are typically used in gas metal arc welding (GMAW) processes, commonly referred to as metal inert gas (MIG) processes. In such processes a wire electrode is fed from the wire feeder, along with welding power and, where suitable, shielding gas, to a welding torch 28. In other applications, however, the wire feeder may not be required, such as for processes commonly referred to as tungsten inert gas (TIG) and stick welding. In all of these processes, however, at some point and electrode 30 is used to complete a circuit through a workpiece 32 and a work clamp 34. The electrode thus serves to establish and maintain an electric arc with the workpiece that aides in melting the workpiece and some processes the electrode, to complete the desired weld.

To allow for feedback control, the system is commonly equipped with a number of sensors which provide signals to the control circuitry during operation. Certain sensors are illustrated schematically in FIG. 1, including engine sensors 36, generator sensors 38, power conditioning circuitry sensors 40, and application sensors 42. As will be appreciated by those skilled in the art, in practice, a wide variety of such sensors may be employed. For example, engine sensors 36 will typically include speed sensors, temperature sensors, throttle sensors, and so forth. The generator sensors 38 will commonly include voltage and current sensors, as will the power conditioning circuitry sensors 40. The application sensors 42 will also typically include at least one of current and voltage sensing capabilities, to detect the application of power to the load.

Figure 2:
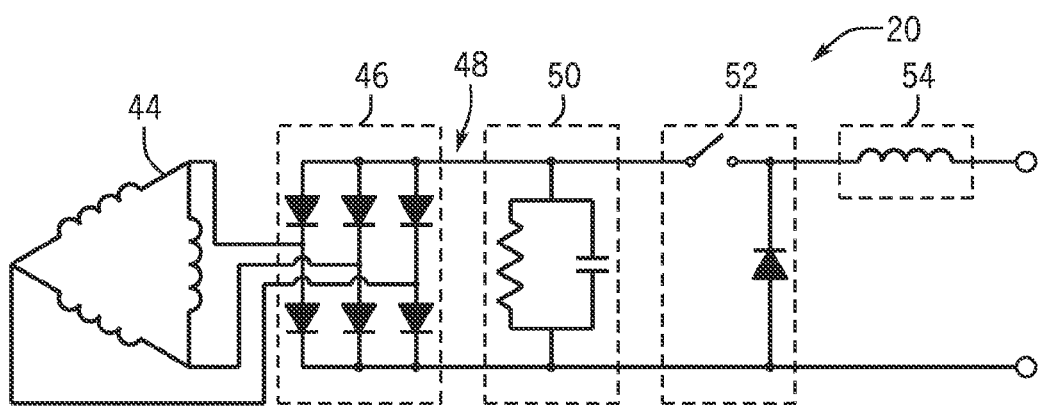
FIG. 2 is a circuit diagram for a portion of the power conversion circuitry of FIG. 1, particularly illustrating certain functional circuit components.

FIG. 2 illustrates electrical circuitry that may be included in the power conditioning circuitry 20 illustrated in FIG. 1. As shown in FIG. 2, this circuitry may include the generator windings 44, illustrated here as arranged in a delta configuration, that output three-phase power to a rectifier 46. In the illustrated embodiment the three-phase rectifier is a passive rectifier comprising a series of diodes that provide a DC waveform to a DC bus 48. Power on the DC bus is then applied to filtering and conditioning circuitry 50 which aide in smoothing the waveform, avoiding excessive perturbations to the DC waveform, and so forth. The DC power is ultimately applied to a switch module 52, which in practice comprises a series of switches and associated electronic components, such as diodes. In welding applications, particular control regimes may allow for producing pulsed output, AC output, DC output, and particularly adapted regimes suitable for specific processes. As will be appreciated by those skilled in the art, various switch module designs may be employed, and these may use available components, such as insulated gate bipolar transistors (IGBTs), silicon controlled rectifiers (SCRs), transformers, and so forth. Many of these will be available in packaging that includes both the switches and/or diodes in appropriate configurations.

Finally, an output inductor 54 is typically used for welding applications. As will be appreciated by those skilled in the welding arts, the size and energy storage capacity of the output inductor is selected to suit the output power (voltage and current) of the anticipated application. Although not illustrated, it should also be noted that certain other circuitry may be provided in this arrangement, and power may be drawn and conditioned in other forms.

While only certain features of the exemplary systems have been illustrated and described herein, many modifications and changes will occur to those skilled in the art. For example, in addition to the output terminals illustrated in FIG. 2, power may be drawn from the DC bus for use in other conversion processes. This may allow for DC welding, for example, as well as for the supply of synthetic AC power for various auxiliary applications. The synthetic auxiliary power may be adapted, for example, for single phase power tools, lighting, and so forth. Where provided, such power may be output via separate terminals, or even conventional receptacles similar to those used for power grid distribution.

Figure 3:
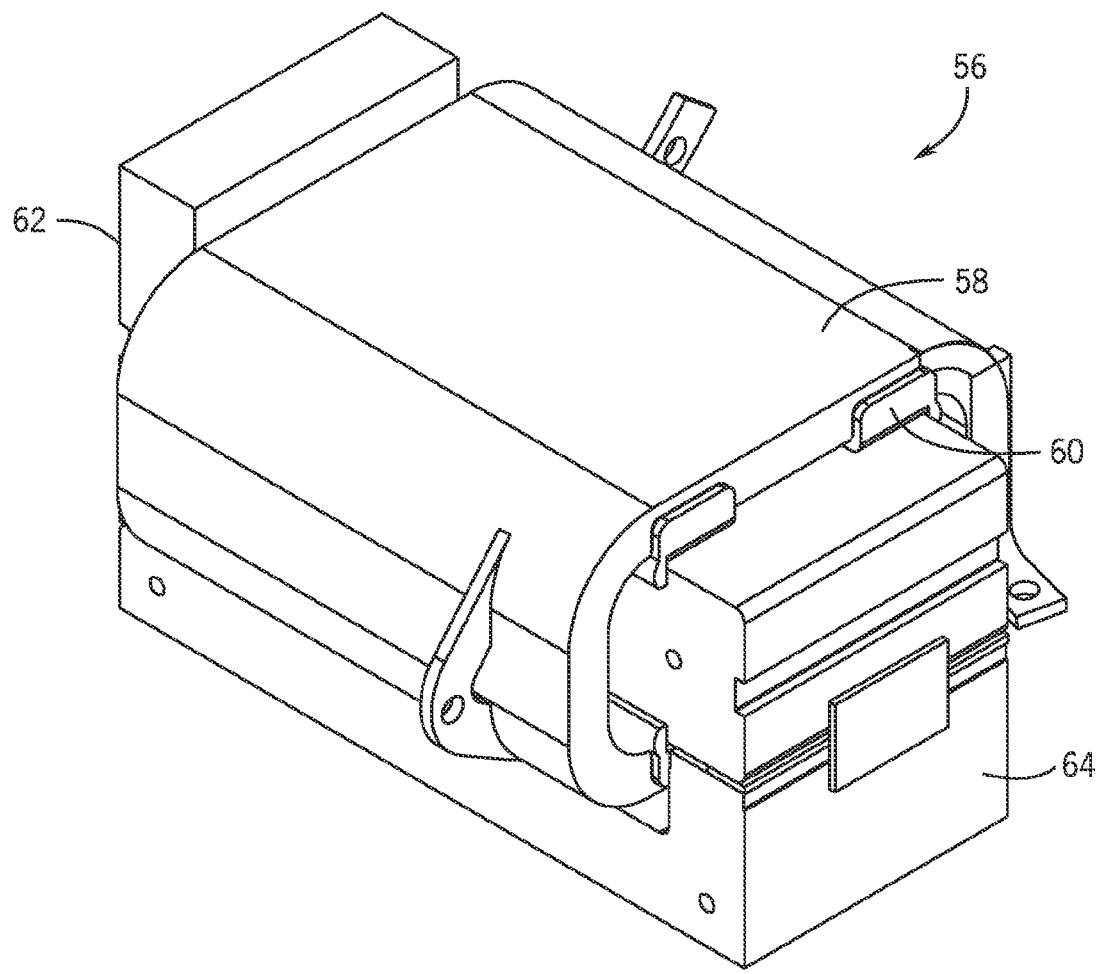
FIG. 3 is a perspective view of an exemplary output inductor for use in a system of the type illustrated in the preceding figures.

The present invention provides a new inductor structure designed to function as the output inductor 54 of FIG. 2. FIG. 3 is a perspective view of a presently contemplated design for the inductor. The inductor assembly, designated generally by reference numeral 56 includes winding 58. A core is provided through and around the winding, in the form of a T-core element 62 and a L-core element 64.

The inductor illustrated and described herein is particularly well-suited to welding applications with certain types of electrodes. That is, the inductor is specifically designed for use in a welding system that may be used with stick electrodes commonly referred to in the art as "XX10" electrodes. As will be appreciated by those skilled in the art, the formulation of such electrodes may lead to high voltage spikes that may occur quickly during welding, requiring higher voltage input, on the order of 40 or more volts. If the voltage requirements are not supplied adequately, the arc may be extinguished during welding, resulting in degraded performance, inferior welds, increased spatter, and so forth. Specifically, the inductor is intended for operation with multi-speed engine driven arrangements that have the ability to maintain a welding arc with a XX10 electrode with operational speeds as low as 2400 to 2800 RPM of the engine drive. Such speeds will result in lower bus voltage, and thus lower output voltage.

The inductor contemplated is specifically oversized to provide higher energy storage which assists in maintaining the weld arc even though the bus voltage may be inadequate. The energy of the magnetic field of the inductor, which may be represented by the letter W is:

$$W = \tfrac{1}{2} L I^2;$$

where W is the stored power of the inductor field, L is the inductance and I is the current through the inductor. As will be appreciated by those skilled in the art, the particular winding and core designs and sizes are selected based upon the number of turns, the reluctance of the material, the cross-sectional area, the length of the core or air gap between core sections, and the permeability of the core material and air. In particular, the inductance may be computed from the relationship:

$$L = N^2 / R;$$

where N is the number of turns of the inductor and R is the reluctance. Moreover, the reluctance itself may be computed from the relationship:

$$R = li/uiAi + lg/uaAg;$$

where li is the length of the core, lg is the length of the air gap, ui is the permeability of the core material times the permeability of air, ua is the permeability of air, Ai is the cross-sectional area of the core, and Ag is the cross-sectional area of the air gap.

In a presently contemplated embodiment, the inductor comprises multiple turns of a winding around a ferrous core material. The term of the coil may have one or multiple connection points to adjust the inductance as necessary. The ferrous core material forms a closed loop which incorporates one or more air gaps or spaces between the T-core element and the L-core element. These gaps are adjusted and sized to provide the desired inductance.

Figure 4:
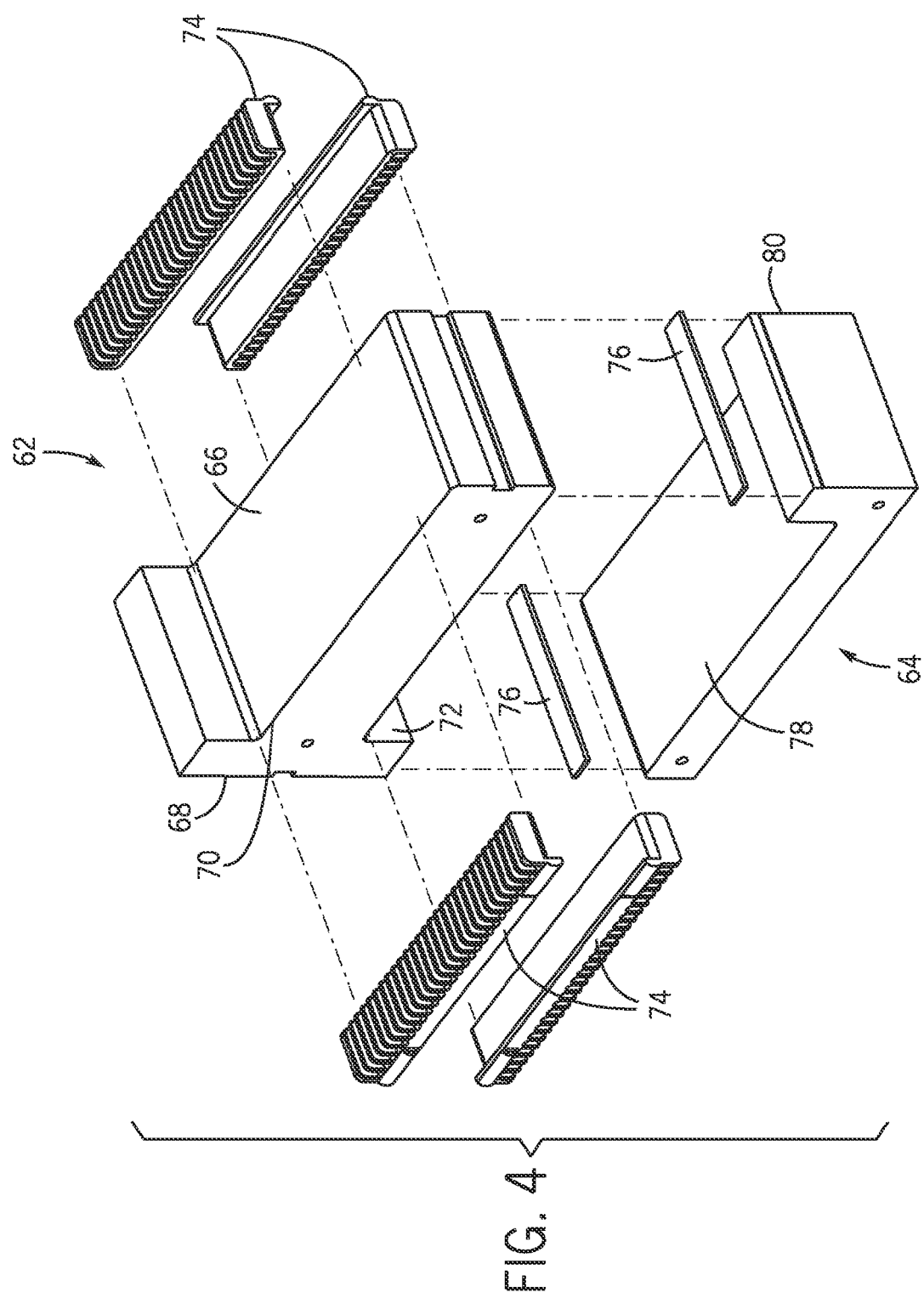
FIG. 4 is an exploded view of the inductor of FIG. 3 showing certain of the structural and functional components.

Referring to FIG. 4, the components of the inductor are illustrated with the housing and winding removed. The T-core element 62 is shown as including a central extension 66 forming the center of the T, and a top section 68 forming the top of the T. Recesses 70 and 72 are thus formed on opposite sides of the central extension. Combs 74 are provided at corners of the central section. These combs are made of a non-conductive material so that the windings can be placed in openings in the combs and avoid direct contact with the core elements. Spacers made of a non-conductive material are provided between the T-core element and the L-core element as indicated by reference numeral 76. The L-core element, then, includes a long side 78 and a short side 80. The spacers 76 are disposed between the short side 80 and the foot of the central extension 66 and between the end of the long side 78 and the edge of the top section 68 of the T-core element. In a presently contemplated embodiment, the combs are made of fiberglass Rynite 530FR. A single winding is formed on the combs, which provide 27 slots, the winding being wound in an edge winding process between ends of the combs. In a presently contemplated embodiment, the core is made of 23 gauge cold rolled steel, with an effective cross-sectional area of 7 in². The winding is made of aluminum, with a cross-sectional area of 0.076 in², in 27 turns. Gaps between the T-core element and the L-core element are nominally 0.083 in.

Figure 5:
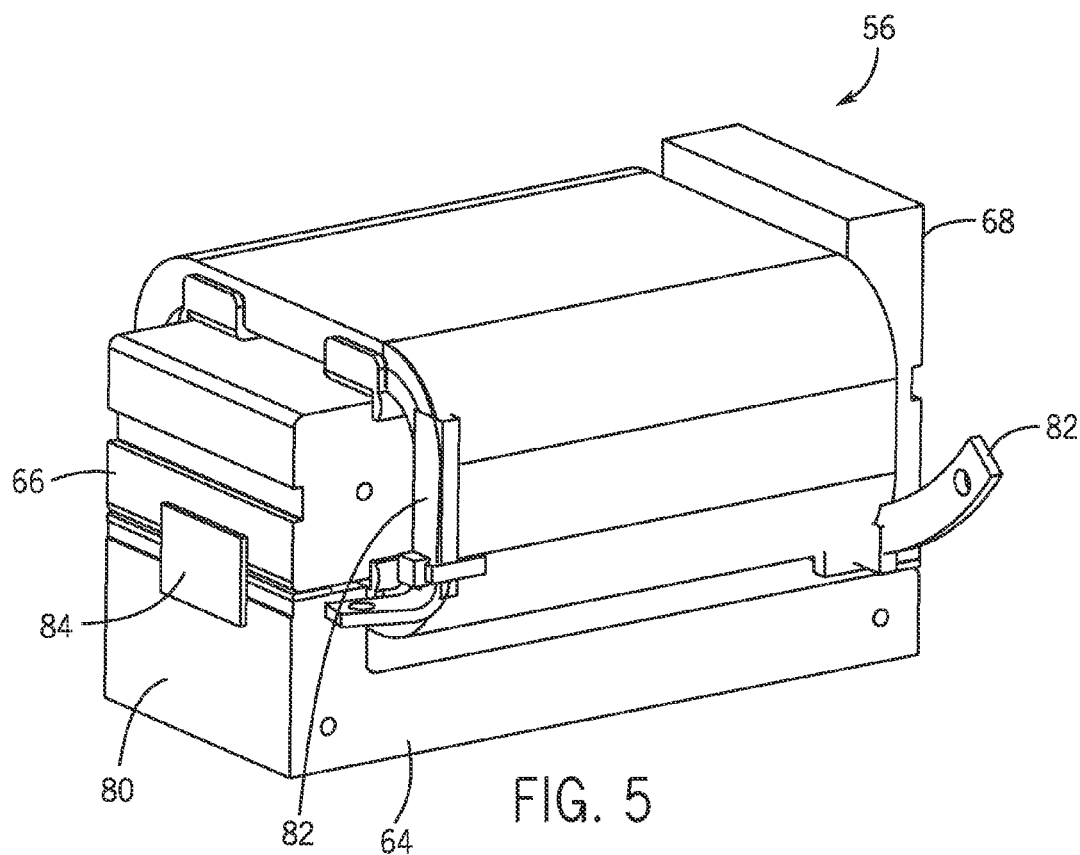
FIG. 5 is a perspective view showing the opposite side of the inductor showing in FIG. 3.
Figure 6:
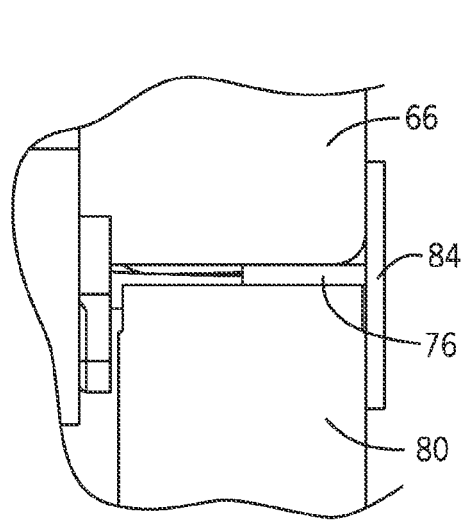
FIGS. 6 and 7 are detailed views showing spacers between the core sections of the inductor.
Figure 7:
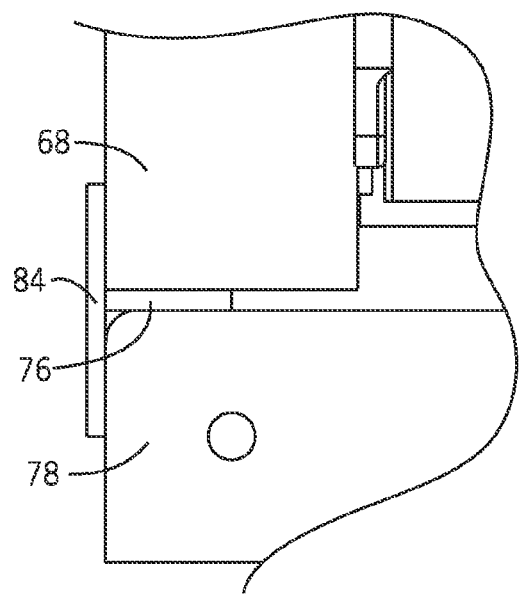

The assembly is shown again in FIG. 5 from the opposite side as compared to FIG. 3. FIG. 5 illustrates connection terminals 82 that provide for routing power into an out of the winding. Also shown in FIG. 5 is a connection piece 84 that is welded between the T-core element 62 and the L-core element 64. A similar weld piece is provided on an opposite side of the structure to maintain the structure integrity of the core and to hold the spacers between the core elements. The location of the spacers is illustrated in FIGS. 6 and 7. In particular, FIG. 6 illustrates a spacer 76 between the central extension 66 of the T-core element and the short side 80 of the L-core element. FIG. 7 similarly shows a spacer 76 between the top 68 of the T-core element and the end of the long side 78 of the L-core element.

In the presently contemplated embodiment, to accommodate XX10 electrodes, the inductor parameters are selected to provide an inductance on the order of 700 mH by contrast, typical welding operations and machinery often include inductors on an output of the power on the order of a magnitude smaller. However, it has been appreciated that for providing lower bus voltages and output voltage levels, while nevertheless storing sufficient power for XX10 electrodes, the particular inductor structure and size greatly improves performance.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
power conversion circuitry configured to provide direct current (DC) output power suitable for performing a stick welding operation;
a torch coupled to the power conversion circuitry and configured to hold a stick electrode and to transfer the DC output power to the stick electrode for the stick welding operation; and
a single inductor coupled between the power conversion circuitry and the torch, the single inductor having an inductance sufficient to store energy from the DC output power to maintain an arc with an XX10 electrode.

2. The welding system of claim 1, wherein the single inductor has an inductance of approximately 700 mH.

3. The welding system of claim 1, wherein the single inductor comprises an L shaped core element, a T shaped core element, the T shaped core element having a central extension with an end disposed adjacent to a short side of the L shaped core element and a top section disposed adjacent to a long side of the L shaped core element, spacers disposed between the L and T shaped core sections at locations where the core sections approach one another, combs disposed about the central extension of the T shaped core element, and a winding disposed in the combs and spaced from the core elements.

4. The welding system of claim 3, wherein the L shaped core element is secured to the T shaped core element.

5. The welding system of claim 4, wherein the L shaped core element is secured to the T shaped core element by welding.

6. The welding system of claim 3, wherein the winding comprises aluminum, the core elements comprise steel, and the spacers comprise fiberglass.

7. The welding system of claim 1, comprising an engine and a generator coupled to the engine to generate alternating current (AC) power applied to the power conversion circuitry.

8. A welding method comprising:
providing direct current (DC) power output suitable for performing a stick welding operation via power conversion circuitry;
initiating and maintaining an arc between an XX10 electrode and a workpiece with the DC power output by the power conversion circuitry; and
storing energy in a single inductor disposed between the power conversion circuitry and the XX10 electrode, the single inductor having an inductance sufficient to store energy from the DC power output to maintain an arc with the XX10 electrode.

9. The method of claim 8, wherein the single inductor has an inductance of approximately 700 mH.

10. The method of claim 8, wherein the single inductor comprises an L shaped core element, a T shaped core element, the T shaped core element having a central extension with an end disposed adjacent to a short side of the L shaped core element and a top section disposed adjacent to a long side of the L shaped core element, spacers disposed between the L and T shaped core sections at locations where the core sections approach one another, combs disposed about the central extension of the T shaped core element, and a winding disposed in the combs and spaced from the core elements.

11. The method of claim 10, wherein the L shaped core element is secured to the T shaped core element.

12. The method of claim 11, wherein the L shaped core element is secured to the T shaped core element by welding.

13. The method of claim 10, wherein the winding of the single inductor comprises aluminum, the core elements comprise steel, and the spacers comprise fiberglass.

14. The method of claim 8, comprising generating alternating current (AC) power via an engine and a generator coupled to the engine, and applying the AC power to the power conversion circuitry for producing the DC power output suitable for performing a stick welding operation.

* * * * *